July 21, 1925.　　　　　　　　　　　　　　　　　1,547,149
K. E. PEILER
FEEDING MOLTEN GLASS
Filed Nov. 18, 1924
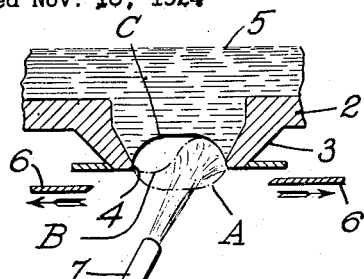
Fig. 1.
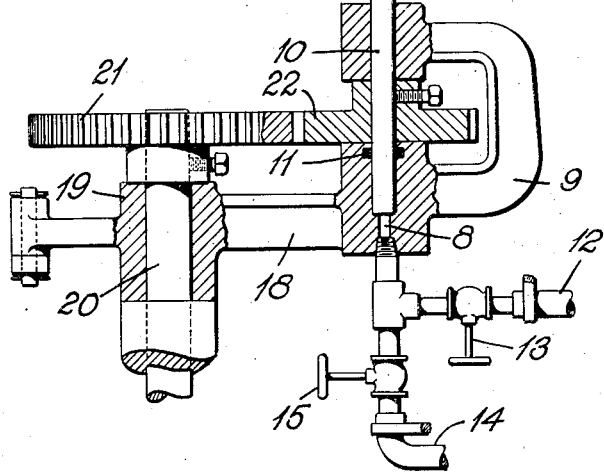
Fig. 2.
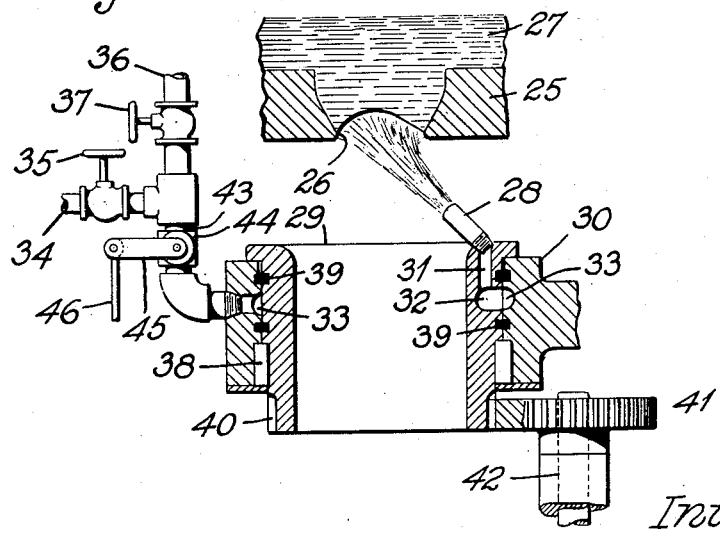
Witness:
S. S. Grotta
Inventor:
Karl E. Peiler
by W. H. Honiss
Att'y.

Patented July 21, 1925.

1,547,149

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

FEEDING MOLTEN GLASS.

Application filed November 18, 1924. Serial No. 750,544.

*To all whom it may concern:*

Be it known that I, KARL E. PEILER, a citizen of the United States, residing at West Hartford, in the county of Hartford and State of Connecticut, have invented certain new and useful Improvements in Feeding Molten Glass, of which the following is a specification.

My invention relates to the art of feeding molten glass and it has special reference to the glass-feeding system in which molten glass is delivered from a container in compact suspended mold charges through a downwardly opening discharge outlet.

One object of my invention is to provide a novel and effective method and apparatus for applying heat in a symmetrical manner at the discharge outlet of a glass feeder.

More specifically, the object of my invention is to provide a glass feeder having a burner below the discharge outlet, this burner being revolved about the axis of the discharge outlet for the purpose of producing symmetrical heating effects upon the glass or upon the outlet walls, and also for the purpose of producing symmetrical dynamic effects upon the glass, if such dynamic effects are desired. The flame of the burner may be caused to play upon the discharge orifice adjacent to the issuing glass, or upon the glass itself, and if the flame is caused to play upon the glass, it may be employed for heating the issuing glass, or for re-heating the stub of glass which remains after the severing operation, or for retarding the descent of the glass through the orifice, or for checking or reversing the movement of the glass. Various combinations of these effects may also be employed, as will be more fully explained below.

In order to permit the discharged glass to fall freely when severed, the rotary burner may either be swung periodically out from under the discharge orifice and back again, or the burner may be mounted permanently out of the path of the descending glass on a rotary support which is also out of the path of the glass.

In the accompanying drawing, Figure 1 is a vertical sectional view, with parts in elevation, showing a construction suitable for carrying out my invention, the burner being adapted to be swung periodically into and out of position below the glass discharge orifice; and Fig. 2 is a vertical sectional view, with parts in elevation, showing a modified construction in which the burner and its rotatable support are mounted permanently out of the path of the descending glass.

Fig. 1 of the drawing shows diagrammatically a portion of the discharge chamber of a glass feeder. The numeral 2 indicates a portion of the bottom wall of the discharge chamber, and the numeral 3 indicates an orifice member which defines a discharge orifice 4, through which glass 5 is discharged from the container. Shears 6 are indicated diagrammatically in open position, and are adapted to close periodically beneath the orifice 4 to sever mold charges of glass suspended beneath the orifice.

A burner 7 is mounted below the discharge orifice 4 for revolution about the vertical axis of this orifice. The burner 7 is supplied with an adjustable mixture of air and gas through a channel 8 formed in a support 9 in which the vertical portion 10 of the burner 7 is journaled for rotation. Suitable packing 11 may be employed for preventing leakage between the channel 8 and the burner member 10. The connections for supplying gas and air to the burner are shown somewhat conventionally, the gas being supplied through a pipe 12 controlled by a valve 13, and the air being supplied through a pipe 14, controlled by a valve 15.

The burner 7 is revolved at a speed sufficient to produce the desired effects by power supplied from a shaft 20 through gears 21 and 22.

The support 9 which carries the burner and its drive gear 22 is carried on a bracket arm 18, which is pivoted to swing about the axis of the drive shaft 8. As shown, the arm 18 has a bearing 19 which surrounds the shaft 8, and the bearing 19 is provided with suitable connections, not shown in detail, for rocking the arm 18 periodically on its axis, to swing the burner 7 out from under the orifice 4 before the operation of severing the glass is completed, and then to swing the burner back again as soon as desired, after the charge of glass has dropped away from the feeder.

The burner 7, as shown, is inclined at such an angle that its flame impinges upon the glass in the orifice 4. This angle may be varied, either by replacing the burner nozzle with other nozzles having different inclinations, or by providing a suitable joint in the burner nozzle for adjusting its angle. By these means, the flame may be caused to impinge upon the orifice, instead of upon the glass, or upon both the orifice and the glass, as may be desired.

The apparatus shown in Fig. 2 differs from that shown in Fig. 1, in that the burner and its support are mounted permanently out of the path of the descending glass, and, therefore, are not required to be swung periodically into and out of position beneath the discharge orifice. Fig. 2 shows diagrammatically at 25 a portion of a glass container having a discharge orifice 26, through which the glass, indicated at 27, issues in the form of periodic discharges. A burner nozzle 28 is mounted below the orifice 26 on a ring 29 that is rotatably mounted on a fixed support 30. The burner nozzle 28 is supplied with air and gas through a vertical passage 31 communicating with a port 32 which, in turn, communicates with a continuous port-groove 33 in the support 30. Air and gas are supplied to the port-groove 33 through a suitable mixer, which is shown somewhat conventionally as including a gas supply pipe 34 controlled by a valve 35, and an air supply pipe 36 controlled by a valve 37.

Roller bearings 38 are provided for allowing easy rotation of the burner ring 29, and packing rings 39 are provided to insure a gas-tight joint between the rotating and stationary parts. For the purpose of rotating the burner ring, this ring is provided with gear teeth 40 meshing with a drive gear 41 on a power shaft 42.

As described above in connection with Fig. 1, the inclination of the burner nozzle 28 of Fig. 2 may be made adjustable so as to cause the flame from this nozzle to impinge upon the glass in the orifice 26, or upon the refractory parts adjacent to the orifice, as may be desired.

Either of the burners described above may be so arranged that its flame is delivered at full force only when the heating or dynamic effects of the flame at the glass outlet are desired, the flame being reduced in the intervals when the burner is inactive. This periodic increase and decrease of the flames may be produced in many ways, one of which is illustrated in Fig. 2, where the pipe 43 which conducts the combustion mixture from the mixer to the burner is provided with a valve 44 having an operating lever 45, which may be rocked periodically, by suitable power connections including a link 46, to increase and decrease the supply of fuel and air to the burner.

In the operation of the apparatus shown in Fig. 1, glass is caused to issue periodically through the discharge orifice 4, the discharge of the glass being either interrupted by the dynamic effect of the flames from the burner 7 beneath the orifice, or being controlled otherwise, as may be desired. The burner mounting may be swung clear of the discharge orifice while the glass is issuing but should in any event be swung clear before the glass is severed by the shears 6. After the glass drops away from the feeder, the burner is swung back beneath the orifice, and the revolution of the burner about the axis of the orifice 4 causes the flame to be applied equally, either to all parts of the orifice upon which it impinges, or to all parts of the glass upon which it impinges. This insures an even heating effect, and prevents one side of the glass from being hotter than another side. As is well understood in the glass-feeding art, it is extremely desirable that a charge of molten glass be given axial symmetry of temperature, and this result is effectively produced by rotating the burner in the manner described herein.

The dynamic effect of the burner flames is also applied evenly to all parts of the glass at the orifice, and this dynamic effect may be utilized either to retard the discharge of the glass, or to reverse it in the orifice. When the dynamic effect of the burner is thus relied upon to check or reverse the movement of the glass, other discharge-controlling means, in the nature of plungers or the like, may be entirely dispensed with.

The apparatus of Fig. 2 operates in the same manner as that of Fig. 1, except that in the structure of Fig. 2, the burner remains permanently in the position shown, the glass being allowed to drop through the burner ring 29.

If the burner were not rotated, any attempt to produce dynamic effects through the high velocity of the burner flame would tend to cause the glass to flow up into one side of the orifice while it continues to descend in the other side, thus preventing proper delivery of the glass. This is illustrated in Fig. 1, where the dotted line A shows the shape of the severed stub of glass. Upon the application of the burner flame, without rotation, the stub A would assume the form indicated by the dotted line B, by reason of the impact of the high-velocity flame. If, however, the burner is rotated at a sufficiently high speed, according to the present invention, the effect of the flame impact is evenly distributed and the stub is "spun" to the shape represented by the line C, giving an even and symmetrical meniscus.

The various effects resulting from the heating and dynamic actions of the burner flames may be regulated in strength by proper adjustments of the burner, and by varying the duration of the period during which the burner is applied. The period of application may also be shifted in time relation to the other feeder operations, such as the shearing of the charges and the time at which each discharge is initiated, and by so shifting the time relation between the various operations, various effects may be produced.

The glass feeding system shown and described herein is well suited to the production of cylindrical mold charges of glass, the burner flame serving to retard the attenuation of the issuing glass according to the principles described at some length in my co-pending applications for Letters Patent, Serial No. 823,694, filed March 10, 1914, and Serial No. 747,503, filed November 3, 1924.

In a related application filed Nov. 5, 1924, Serial No. 747,973, I have disclosed the use of a rotating flame for the purpose of reheating glass parisons or other solid glass articles.

The structures shown in the accompanying drawing are well suited for carrying out my invention, but it will be understood that numerous other arrangements may be employed within the scope of the appended claims.

I claim as my invention:

1. The method of feeding molten glass that comprises causing the glass to issue from a discharge outlet, and directing toward the said discharge outlet a revolving flame capable of symmetrically modifying the temperature at the said outlet.

2. The method of feeding molten glass that comprises causing the glass to issue from a discharge outlet, and directing toward the said outlet a flame revolving about the central axis of the said outlet and capable of modifying the temperature of the glass at the said outlet.

3. The method of feeding molten glass that comprises causing the glass to issue from a downwardly opening discharge outlet, and directing toward the said outlet a flame revolving about the vertical axis of the said outlet and capable of modifying the temperature of the glass at the said outlet.

4. The method of feeding molten glass that comprises causing the glass to issue from a downwardly opening discharge outlet, and periodically modifying the rate of discharge of the said glass by directing upon the glass at the said outlet a dynamically-acting flame revolving about the vertical axis of said outlet.

5. The method of feeding molten glass that comprises causing the glass to issue from a downwardly opening discharge outlet, periodically modifying the rate of discharge of the said glass by directing upon the glass at the said outlet a dynamically-acting flame revolving about the vertical axis of said outlet, and removing said flame from beneath said outlet in the intervals between said discharge modifying operations.

6. The method of feeding molten glass, that comprises causing the glass to issue from a container through a downwardly opening discharge outlet, periodically severing mold charges from the issuing glass, and, in the intervals between said severing operations, applying to the outlet a flame revolving around the vertical axis of the said outlet.

7. The method of feeding molten glass, that comprises causing the glass to issue from a container through a downwardly opening discharge outlet, periodically severing mold charges from the issuing glass, and in the intervals between said severing operations, applying to the glass in the said outlet a flame revolving around the vertical axis of the said outlet.

8. The method of feeding molten glass, that comprises causing the glass to issue from a container through a downwardly opening discharge outlet, periodically severing mold charges from the issuing glass, and, in the intervals between said severing operations, retarding the issue of glass from said outlet by directing upon the glass at the said outlet a dynamically-active flame revolving about the vertical axis of said outlet.

9. Apparatus for feeding molten glass, comprising a container for the glass having a discharge outlet, and means for directing a revolving flame toward the said outlet.

10. Apparatus for feeding molten glass, comprising a container for the glass having a discharge outlet, means for directing a flame toward the said outlet, and means for revolving the said flame about the central axis of the said outlet.

11. Apparatus for feeding molten glass, comprising a container for the glass having a downwardly opening discharge outlet, and means for directing a revolving flame toward the said outlet.

12. Apparatus for feeding molten glass, comprising a container for the glass having a downwardly opening discharge outlet, means for directing a flame toward said outlet, and means for revolving the said flame about the vertical axis of the said outlet.

13. Apparatus for feeding molten glass, comprising a container for the glass having a downwardly opening discharge outlet, and a burner for directing flame toward said outlet, the said burner being mounted below the said outlet and being revoluble around the vertical axis of the said outlet.

14. Apparatus for feeding molten glass, comprising a container for the glass having a downwardly opening discharge outlet, shears for severing mold charges from the glass discharged from said outlet, and a burner for directing flame toward said outlet, the said burner being mounted below the said outlet and being revoluble around the vertical axis of the said outlet.

15. Apparatus for feeding molten glass, comprising a container for the glass having a downwardly opening discharge outlet, shears for severing mold charges from the glass discharged from said outlet, a burner for directing flame toward said outlet, the said burner being mounted below the said outlet and being revoluble around the vertical axis of the said outlet, and the flame from the said burner being capable of acting dynamically upon the glass to modify the discharge of the glass through the said outlet.

16. Apparatus for feeding molten glass, comprising a container for the glass having a downwardly opening discharge outlet, a burner below said outlet, a support for the said burner, the said support being movable to bring the said burner into and out of position beneath the said outlet, and gearing for revolving the said burner around a vertical axis.

17. Apparatus for feeding molten glass, comprising a container for the glass having a downwardly opening discharge outlet, shears for severing mold charges from the glass issuing from the said outlet, a burner below the said outlet having its nozzle inclined and directed toward said outlet, a rotatable support for said burner nozzle, means for moving said support periodically to bring said burner into and out of position beneath the said outlet, and gearing for rotating the said support.

Signed at Hartford, Conn., this 14th day of November, 1924.

KARL E. PEILER.